United States Patent
Pawley et al.

(10) Patent No.: US 7,484,605 B2
(45) Date of Patent: *Feb. 3, 2009

(54) OVERRUNNING RADIAL COUPLING ASSEMBLY AND METHOD FOR CONTROLLING THE ENGAGEMENT OF INNER AND OUTER MEMBERS OF THE ASSEMBLY

(75) Inventors: Brice A. Pawley, Midland, MI (US); Brian W. Smithwick, Clio, MI (US)

(73) Assignee: Means Industries, Inc., Saginaw, MI (US)

( * ) Notice: Subject to any disclaimer, the term of this patent is extended or adjusted under 35 U.S.C. 154(b) by 375 days.

This patent is subject to a terminal disclaimer.

(21) Appl. No.: 11/429,548

(22) Filed: May 5, 2006

(65) Prior Publication Data

US 2006/0278487 A1    Dec. 14, 2006

Related U.S. Application Data

(63) Continuation-in-part of application No. 11/148,910, filed on Jun. 9, 2005, now Pat. No. 7,258,214.

(51) Int. Cl.
*F16D 41/16* (2006.01)
(52) U.S. Cl. ............................ 192/43.1; 192/46; 192/47
(58) Field of Classification Search ............... 192/39, 192/43.1; 188/82.2, 82.4, 82.77
See application file for complete search history.

(56) References Cited

U.S. PATENT DOCUMENTS

| | | | |
|---|---|---|---|
| 2,971,621 A * | 2/1961 | Sinclair et al. | ............... 192/46 |
| 5,070,978 A | 12/1991 | Pires | |
| 5,449,057 A | 9/1995 | Frank | |
| 5,597,057 A | 1/1997 | Ruth et al. | |
| 5,806,643 A | 9/1998 | Fitz | |
| 5,871,071 A | 2/1999 | Sink | |
| 5,918,715 A | 7/1999 | Ruth et al. | |
| 5,927,455 A | 7/1999 | Baker et al. | |
| 5,964,331 A | 10/1999 | Reed et al. | |
| 5,979,627 A | 11/1999 | Ruth et al. | |
| 6,065,576 A | 5/2000 | Shaw et al. | |
| 6,116,394 A | 9/2000 | Ruth | |
| 6,125,980 A | 10/2000 | Ruth | |
| 6,129,190 A | 10/2000 | Reed et al. | |
| 6,186,299 B1 | 2/2001 | Ruth | |
| 6,193,038 B1 | 2/2001 | Scott et al. | |
| 6,244,965 B1 | 6/2001 | Klecker et al. | |

(Continued)

*Primary Examiner*—Rodney H Bonck
(74) *Attorney, Agent, or Firm*—Brooks Kushman P.C.

(57) ABSTRACT

The overrunning radial coupling assembly or clutch and a method of controlling the engagement of inner and outer plates or members of the assembly are provided wherein adjacent engaging radial locking pawls are selectively controlled by a single, rotatable control plate or element to obtain full lock, one-way lock and one-way overrun conditions. The assembly includes free-floating, forward pawls and free-floating, reverse pawls adjacent to their respective forward pawls. The forward and reverse pawls are movable between a notch-engaging, engaged position (i.e., full lock condition) and a disengaged position in which the outer member is permitted to free-wheel relative to the inner member in the one-way overrun condition in one direction about a first axis and the outer member is locked to the inner member in the one-way lock condition in the opposite direction. A number of different embodiments of the assembly and method are provided.

28 Claims, 11 Drawing Sheets

U.S. PATENT DOCUMENTS

| | | |
|---|---|---|
| 6,290,044 B1 | 9/2001 | Burgman et al. |
| 6,386,349 B1 | 5/2002 | Welch |
| 6,481,551 B1 | 11/2002 | Ruth |
| 6,505,721 B1 | 1/2003 | Welch |
| 6,516,931 B2 * | 2/2003 | Kroger ................. 192/46 |
| 6,571,926 B2 | 6/2003 | Pawley |
| 6,854,577 B2 | 2/2005 | Ruth |
| 7,100,756 B2 | 9/2006 | Kimes et al. |
| 7,223,198 B2 | 5/2007 | Kimes et al. |
| 7,258,214 B2 * | 8/2007 | Pawley et al. ........... 192/43.1 |
| 7,344,010 B2 | 3/2008 | Fetting, Jr. et al. |
| 2006/0021835 A1 | 2/2006 | Kimes et al. |
| 2006/0021836 A1 | 2/2006 | Kimes et al. |
| 2006/0021837 A1 | 2/2006 | Kimes et al. |
| 2006/0021838 A1 | 2/2006 | Kimes et al. |
| 2006/0021839 A1 | 2/2006 | Kimes et al. |
| 2006/0021840 A1 | 2/2006 | Kimes et al. |
| 2006/0021841 A1 | 2/2006 | Kimes et al. |
| 2006/0025279 A1 | 2/2006 | Kimes et al. |
| 2006/0185957 A1 | 8/2006 | Kimes et al. |
| 2007/0062775 A1 | 3/2007 | Bird et al. |
| 2007/0131509 A1 | 6/2007 | Kimes |

* cited by examiner

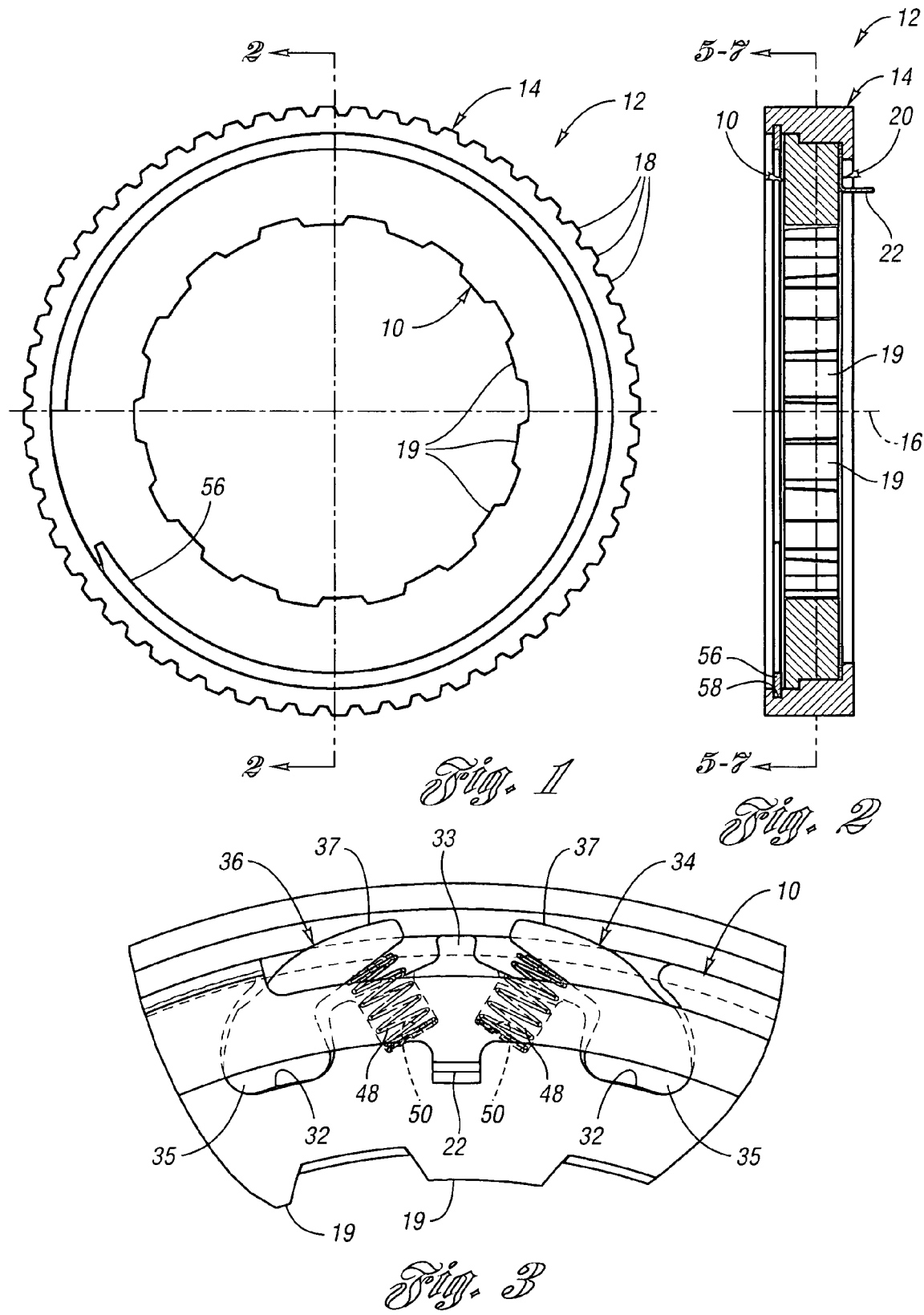

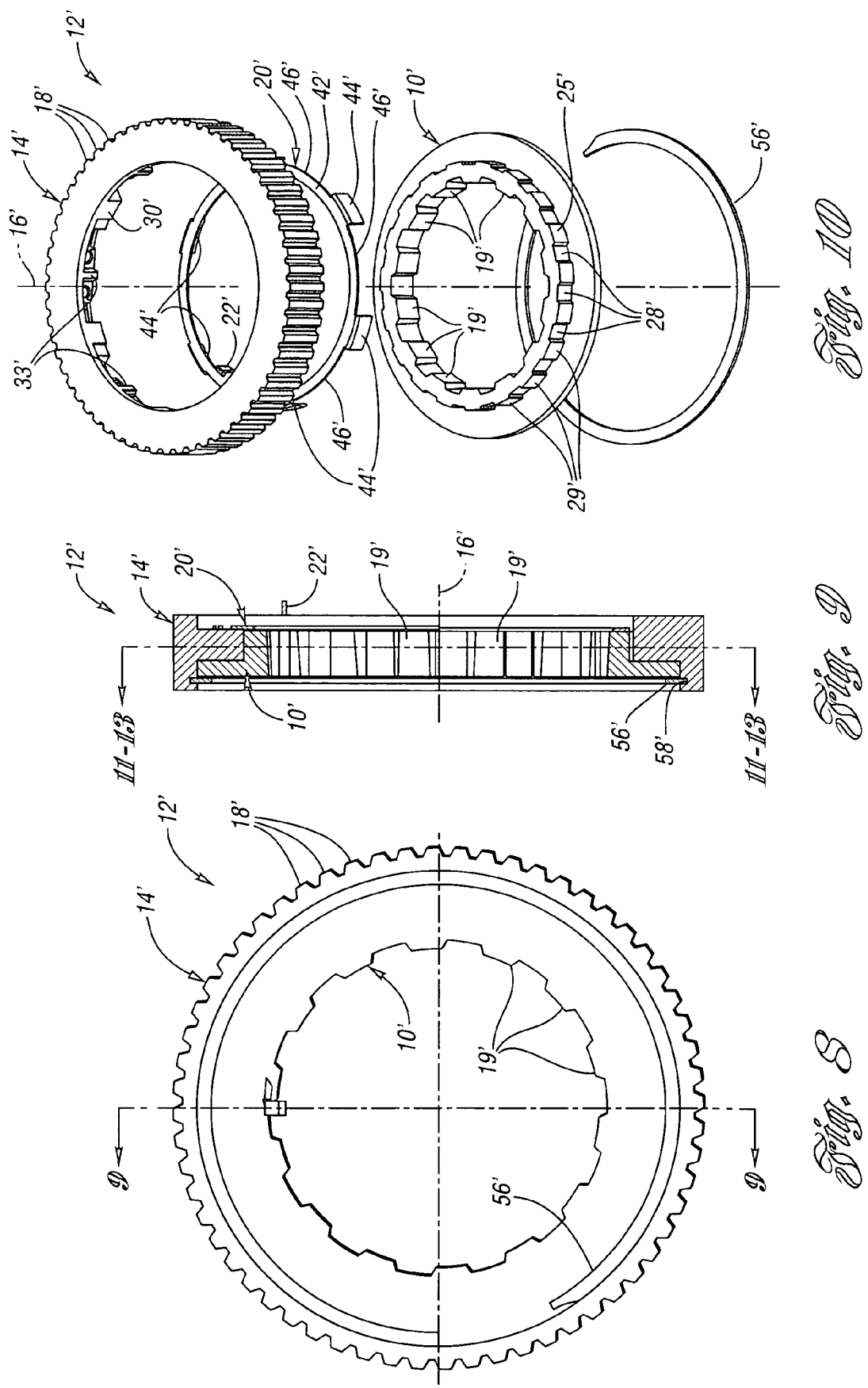

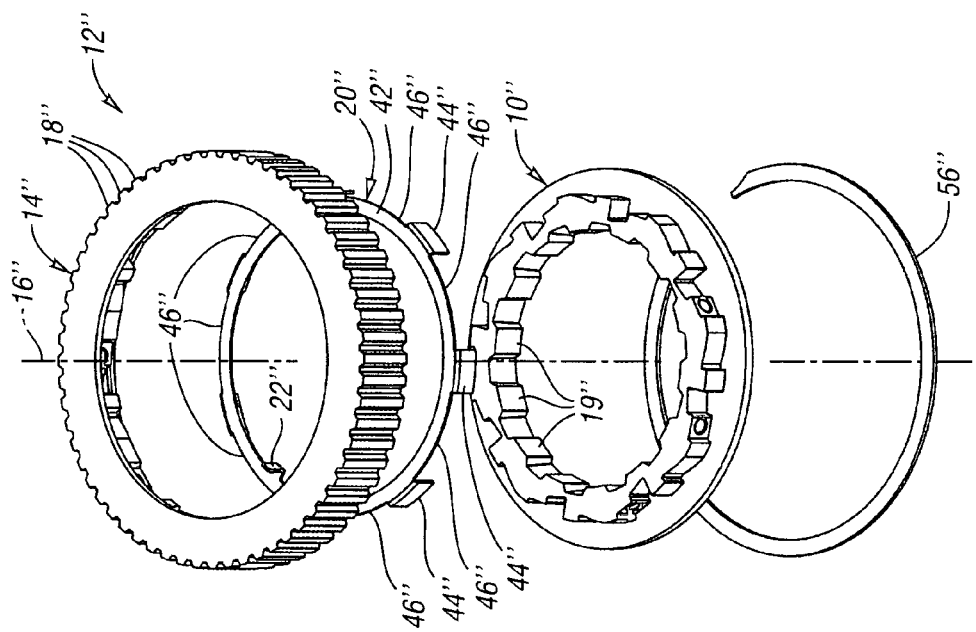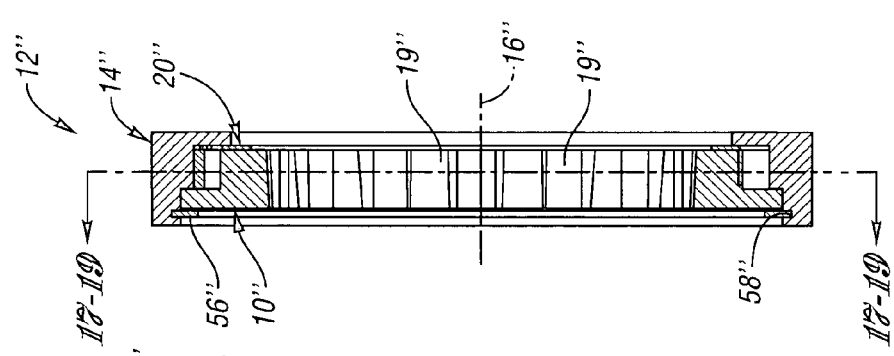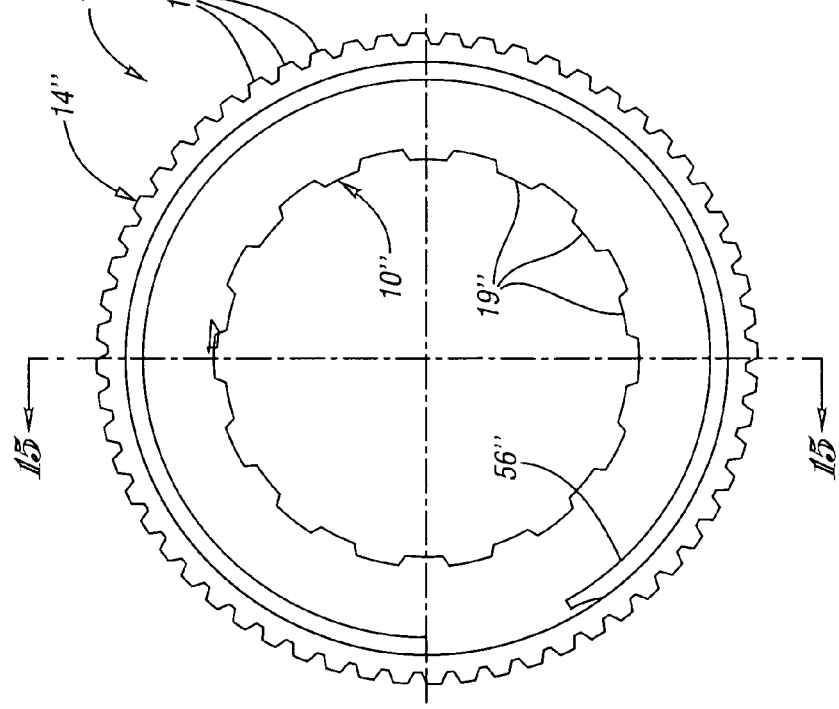

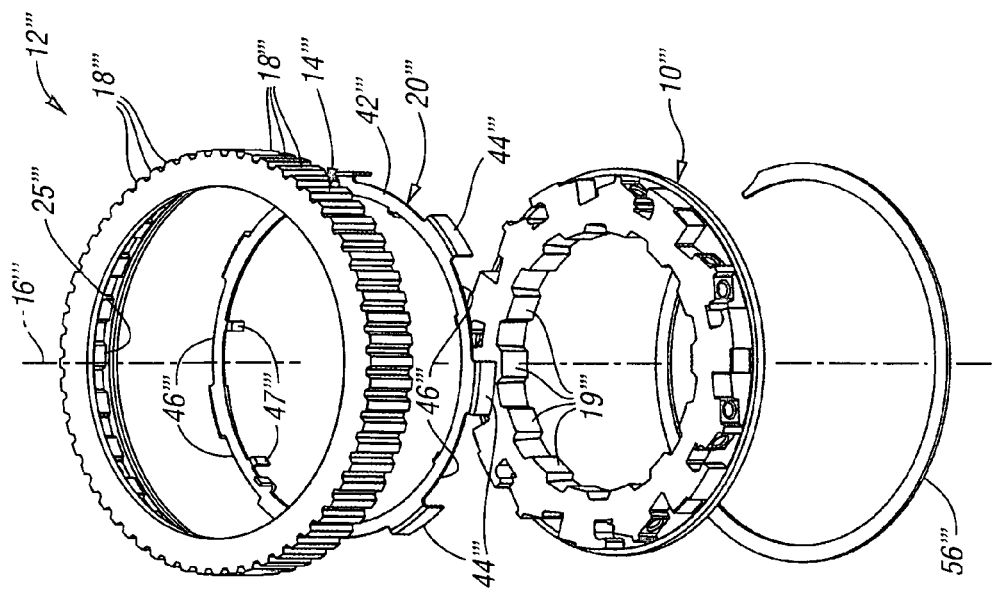
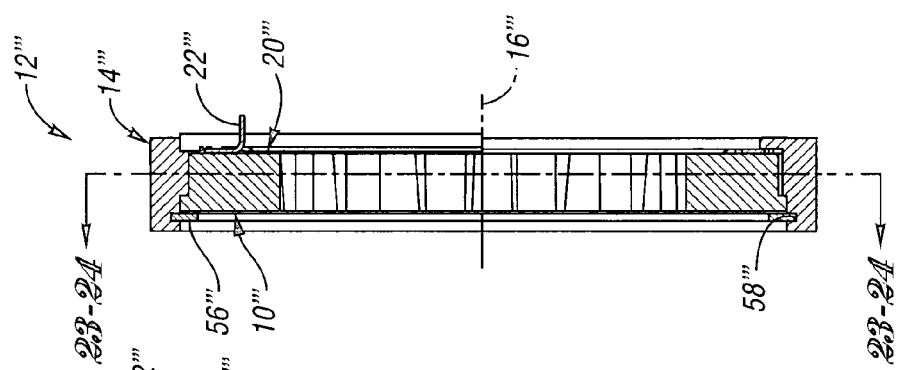
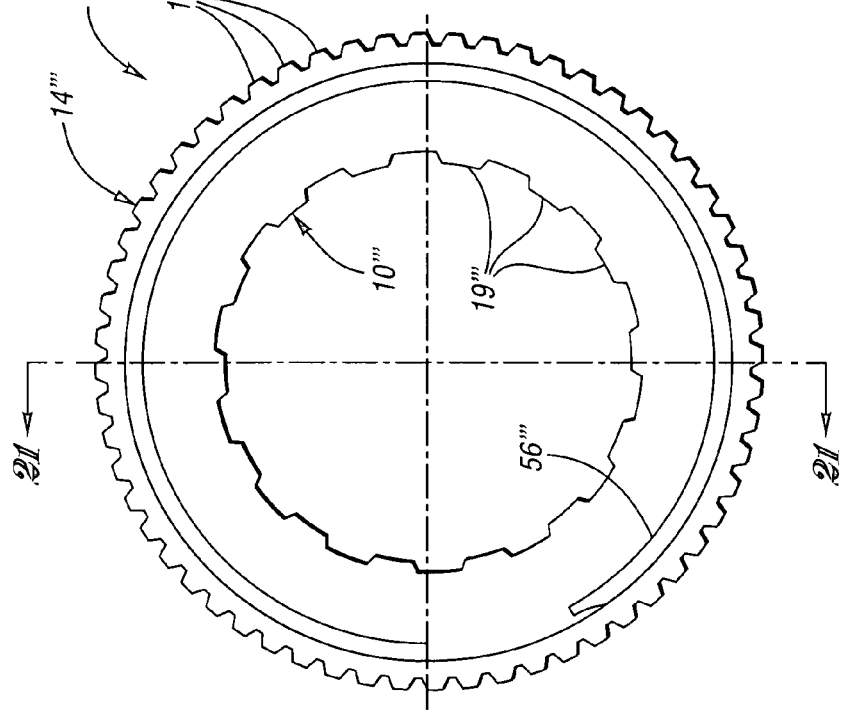

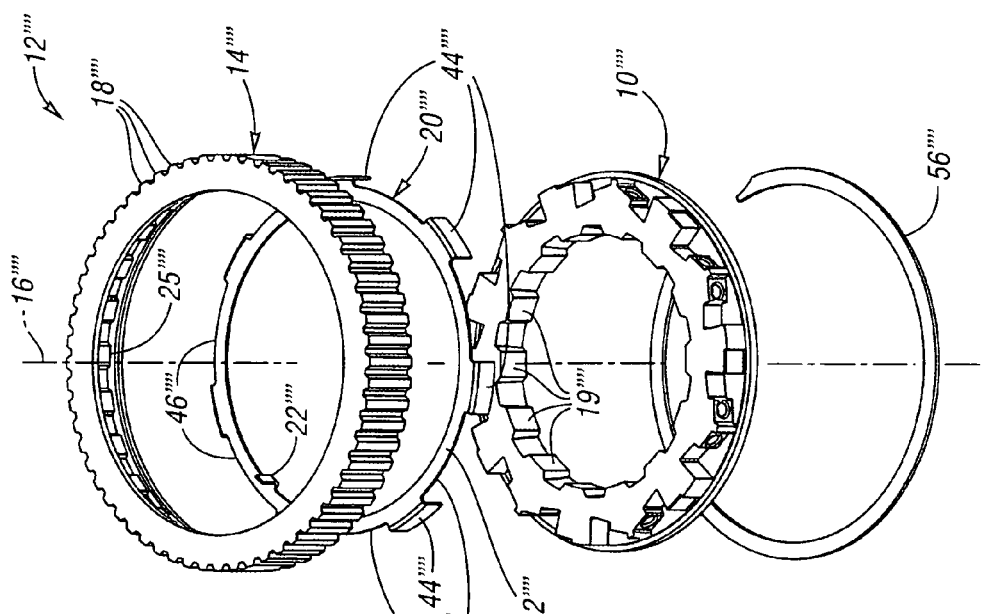
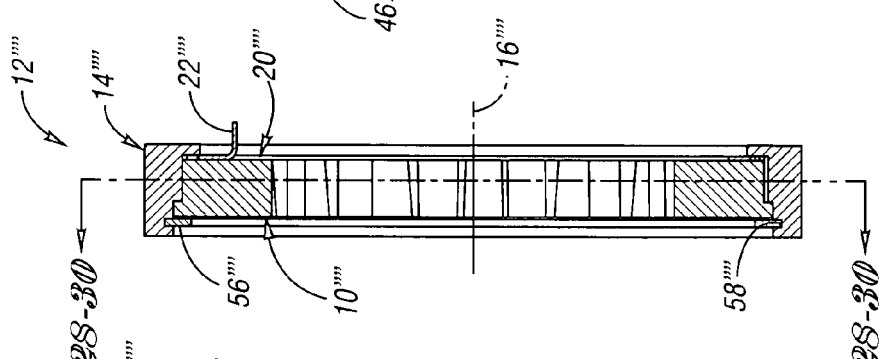
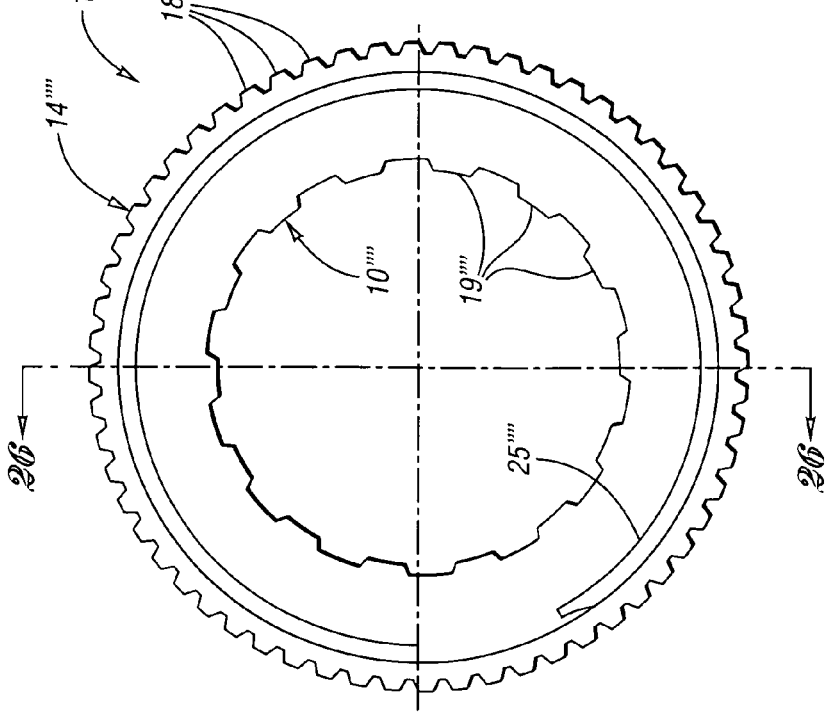

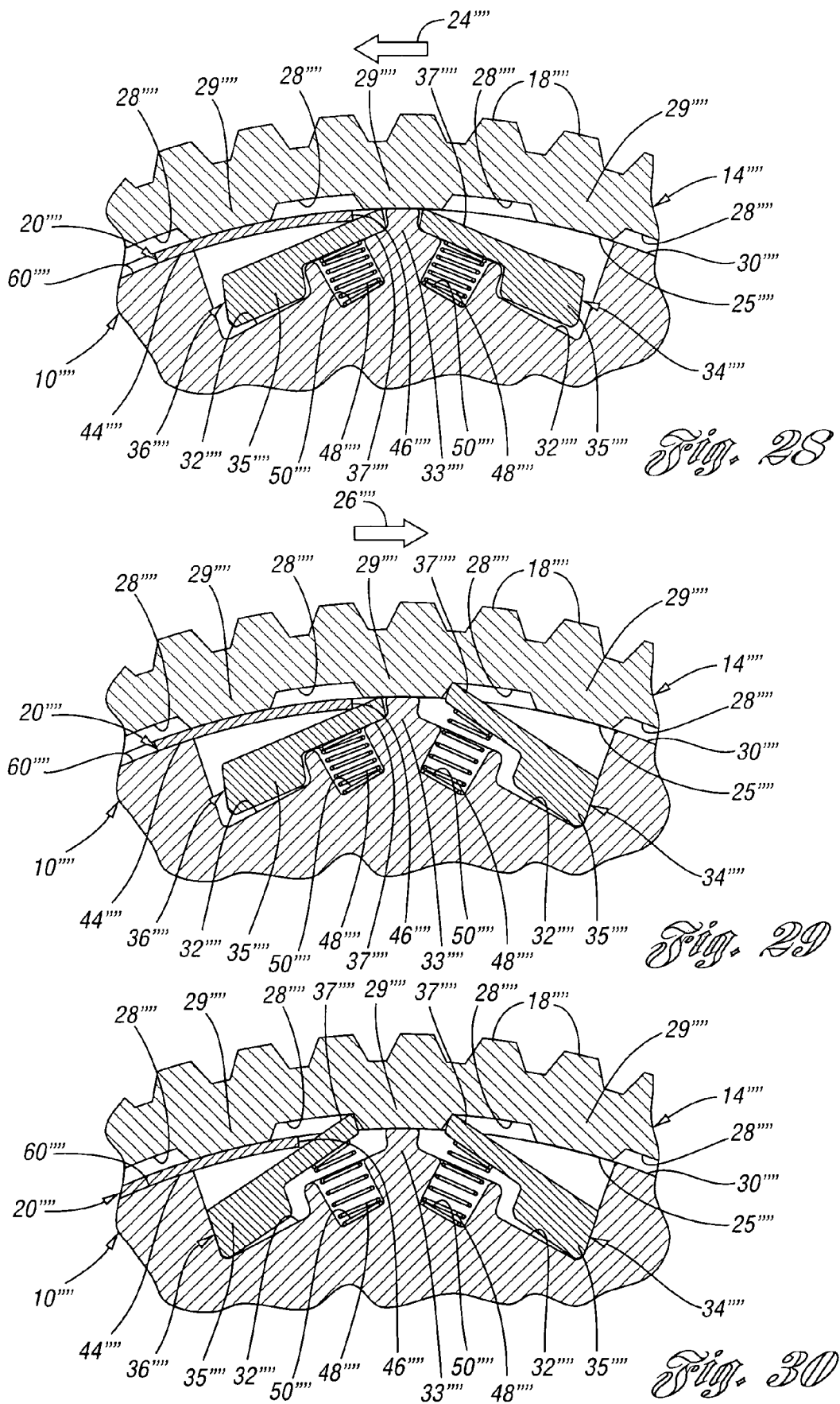

OVERRUNNING RADIAL COUPLING ASSEMBLY AND METHOD FOR CONTROLLING THE ENGAGEMENT OF INNER AND OUTER MEMBERS OF THE ASSEMBLY

CROSS-REFERENCE TO RELATED APPLICATIONS

This application is a continuation-in-part of U.S. application Ser. No. 11/148,910 filed Jun. 9, 2005, now U.S. Pat. No. 7,258,214 and entitled "Overrunning Coupling Assembly And Method For Controlling The Engagement of Planar Members."

BACKGROUND OF THE INVENTION

1. Field of the Invention

This invention relates to overrunning radial coupling assemblies such as clutches and methods for controlling the engagement of inner and outer members of the assemblies.

2. Background Art

Overrunning coupling assemblies may be used for transferring torque from a driving member to a driven member in a variety of structural environments. This permits the transfer of torque from a driving member to a driven member while permitting freewheeling motion of the driving member relative to the driven member when torque is interrupted. Such couplings often comprise an outer race concentrically disposed with respect to an inner race, the outer race having cammed surfaces that define a pocket in which coupling rollers are assembled.

A driving member is connected to one race, and a driven member is connected to the other race. During torque transfer from the driving member to the driven member, the rollers become locked with a camming action against the cam surfaces, thereby establishing a positive driving connection between the driving member and the driven member. When the torque is interrupted, the driven member may freewheel relative to the driving member as the rollers become unlocked from their respective cam surfaces.

Another common overrunning coupling includes inner and outer races wherein one race is connected to a driving member and the other race is connected to the driven member. Overrunning coupling sprags are disposed between the inner cylindrical surface of the outer race and the outer cylindrical surface of the inner race so that the sprags lock the races together as torque is delivered to the driven member. The sprags become unlocked with respect to the inner and outer race surfaces when torque transfer is interrupted.

U.S. Pat. No. 5,927,455 discloses a bi-directional overrunning pawl-type clutch having a driving member mounted for power rotation, a driven member mounted for rotation adjacent the driving member, with each of the driving and driven members having pawl engaging shoulders, and a plurality of rigid pawls interposed between the driving and driven members. A control element is mounted for shifting movement between the driving and driven members to control the position of the pawls which are yieldably biased toward positions of engagement extending between the driving and driven members to produce driving engagement therebetween. The control element is shiftable to various positions to permit driving and overrunning in one direction or driving and overrunning in the opposite direction dependent upon the direction of rotation of the driving member.

U.S. Pat. No. 6,244,965 discloses a planar overrunning coupling for transfer of torque from a driving member to a driven member in one direction and which permits freewheeling motion between the members upon a torque reversal. The coupling includes coupling plates situated in close proximity with a strut retainer plate disposed between them. One plate is connected to the driving member and the other plate is connected to the driven member. Each plate has strut recesses. A series of struts is located in the recesses of one plate so that each strut may be pivoted, thereby allowing the struts to engage the companion recesses in the other coupling plate. The retainer has angularly spaced apertures that register with the struts to permit pivotal movement of the struts when the retainer plate is in one rotary position. The retainer plate, when it is in a second rotary position, prevents pivotal motion of the struts, thereby permitting freewheeling relative motion of the coupling plates.

U.S. Pat. No. 6,116,394 discloses an overrunning coupling assembly including a notch plate and an annular coupling pocket plate positioned in face-to-face relationship with respect to each other along a common axis. The pocket plate includes strut pockets disposed at angularly spaced positions about the axis. The notch plate includes notch recesses at angularly spaced positions about the common axis and positioned in juxtaposed relationship with respect to the strut pockets. The notch plate includes an inner circumferential rail at a radially inward side of the notch recesses and an outer circumferential rail at a radially outward side of the notch recesses. Torque-transmitting struts are positioned in the strut pockets. Each strut has first and second ears at one edge thereof for enabling pivotal motion of the struts about an ear axis intersecting the ears. The opposite edge of each strut is engageable with one of the notch recesses whereby one-way torque transfer may occur between the plates. Each opposite edge has first and second corners. Each strut pocket is sufficiently enlarged to allow pivotal movement of each strut about a strut axis which is parallel with the common axis, thereby enabling one of the first and second corners to be selectively supported by one of the inner and outer circumferential rails to prevent the struts from slapping against the notch recesses as the notch plate and pocket plate are respectively counterrotated.

U.S. Pat. No. 5,964,331 discloses a one-way clutch comprising a pocket plate and a notch plate situated in a juxtaposed adjacent relationship. One-way clutches of this kind are sometimes referred to as planar clutches because the adjacent juxtaposed surfaces are situated in radial planes with respect to the axis of the clutch.

For purposes of this application, the term coupling should be interpreted to include clutches or brakes wherein one of the plates is drivably connected to a torque delivery element of a transmission and the other plate is drivably connected to another torque delivery element or is anchored and held stationary with respect to a transmission housing. The terms coupling, clutch and brake may be used interchangeably.

A pocket plate may be provided with angularly disposed recesses or pockets about the axis of a one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Other U.S. patents related to the present invention include: U.S. Pat. Nos. 5,070,978; 5,449,057; 5,806,643; 5,871,071; 5,918,715; 5,979,627; 6,065,576; 6,125,980; 6,129,190; 6,186,299; 6,193,038; 6,386,349; 6,481,551; 6,505,721; 6,571,926; and 6,854,577.

It is often desirable to have opposed engaging struts in a selectable or controllable clutch or coupling assembly. It is also desirable to have an overrunning or free-wheeling capability in such clutches or assemblies. One way to control such sets of opposed struts or keys is to provide two slide or control plates which add cost and complexity to the selectable clutch. Such plates may be difficult to control external to the clutch.

SUMMARY OF THE INVENTION

An object of the present invention is to provide an overrunning radial coupling assembly and method for controlling the engagement of inner and outer members of the assembly wherein plates or members of the assembly are designed to minimize the above-noted cost, complexity and control concerns.

In carrying out the above object and other objects of the present invention, an overrunning radial coupling assembly is provided. The assembly includes an inner member having an outer peripheral surface and an outer member having an inner peripheral surface adjacent the outer peripheral surface in radially inner and radially outer relationship. At least one of the members is mounted for rotation about a first axis. The assembly also includes pawl-receiving portions and pawl-holding portions formed on the members. The assembly further includes at least one free-floating, forward pawl and at least one free-floating, reverse pawl adjacent to the at least one forward pawl. The pawls are received and retained in the pawl-holding portions but not physically secured to the pawl-holding portions. The forward and reverse pawls are movable between an engaged position between the pawl-receiving and pawl-holding portions and a disengaged position in which one of the members is permitted to free-wheel relative to the other of the members. The assembly includes a set of biasing members carried by the pawl-holding portions and urging the forward and reverse pawls outwardly from their respective pawl-holding portions. The assembly also includes a single control element mounted for controlled, shifting movement between the surfaces relative to the pawl-holding portions and operable to control position of at least one of the pawls. The control element has at least one opening which extends completely therethrough to allow the forward and reverse pawls to extend therethrough to the engaged position in a first position of the control element to fully lock the inner and outer members together to prevent relative rotation between the inner and outer members in either direction about the first axis. The control element maintains at least one of the pawls in its disengaged position in a second position of the control element.

The control element may allow the at least one forward pawl to extend therethrough to one of the pawl-receiving portions in the second position to lock the inner and outer members together in a first direction about the first axis but not in a second direction opposite the first direction about the first axis.

Relative rotation between the outer member and the inner member in the second direction about the first axis in the second position of the control element may cause the pawl-receiving portions to act against the at least one forward pawl to move the at least one forward pawl towards its disengaged position against the urging of its biasing member to permit free-wheeling.

The forward and reverse pawls may be received and retained in same member, such as either the inner member or outer member. Alternatively, the forward and reverse pawls may be received and retained in different members.

The at least one forward pawl and the at least one reverse pawl may extend through the same opening in the control element in the engaged position.

A plurality of adjacent notches may be formed in the inner peripheral surface wherein one forward pawl and one reverse pawl engage adjacent notches in the inner peripheral surface in the engaged position.

The assembly may further include an operating member operatively connected to the control element to selectively shift the control element between its first and second positions.

The control element may comprise a plate-like member.

The inner and outer members may comprise plate-like members.

The control element may include at least one control portion which urges at least one forward pawl toward its engaged position in the first position of the control element.

Further in carrying out the above object and other objects of the present invention, an overrunning radial coupling assembly is provided. The assembly includes an inner member having an outer peripheral surface and an outer member having an inner peripheral surface adjacent the outer peripheral surface in radially inner and radially outer relationship. At least one of the members is mounted for rotation about a first axis. The assembly also includes pawl-receiving portions and pawl-holding portions formed on the members. The assembly further includes at least one free-floating, forward pawl and at least one free-floating, reverse pawl adjacent to the at least one forward pawl. The pawls are received and retained in the pawl-holding portions but not physically secured to the pawl-holding portions. The forward and reverse pawls are movable between an engaged position between the pawl-receiving and pawl-holding portions and a disengaged position in which one of the members is permitted to free-wheel relative to the other of the members. The assembly includes a single control element mounted for controlled rotation about the first axis relative to the pawl-holding portions between first and second angular positions between the surfaces. The element is operable to control position of at least one of the pawls. The control element has at least one opening which extends completely therethrough to allow the forward and reverse pawls to extend therethrough to the engaged position in the first angular position of the control element to fully lock the inner and outer members together to prevent relative rotation between the inner and outer members in either direction about the first axis. The control element maintains at least one of the pawls in its disengaged position in the second angular position of the control element.

The control element may allow the at least one forward pawl to extend therethrough to one of the pawl-receiving portions in the second angular position to lock the inner and outer members together in a first direction about the first axis but not in a second direction opposite the first direction about the first axis.

Relative rotation between the outer member and the inner member in the second direction about the first axis in the second angular position of the control element may cause the pawl-receiving portions to act against the at least one forward pawl to move the at least one forward pawl towards its disengaged position to permit free-wheeling.

The forward and reverse pawls may be received and retained in the same member, such as either the inner member or the outer member. Alternatively, the forward and reverse pawls may be received and retained in different members.

The at least one forward pawl and the at least one reverse pawl may extend through the same opening in the control element in the engaged position.

A plurality of adjacent notches may be formed in the inner peripheral surface wherein one forward pawl and one reverse pawl engage adjacent notches in the inner peripheral surface in the engaged position.

The assembly may further include an operating mechanism operatively connected to the control element to selectively shift the control element between its first and second angular positions.

The control element may comprise a plate-like member.

The inner and outer members may comprise plate-like members.

The control element may include at least one control portion which urges the at least one forward pawl toward its engaged position in the first position of the control element.

Still further in carrying out the above object and other objects of the present invention, a method of controlling the engagement of inner and outer members is provided. The inner member has an outer peripheral surface. The outer member has an inner peripheral surface adjacent the outer peripheral surface in radially inner and radially outer relationship. At least one of the members is mounted for rotation about a first axis. Pawl-receiving portions and pawl-holding portions are formed on the members. The method includes providing at least one free-floating, forward pawl and at least one free-floating, reverse pawl adjacent to the at least one forward pawl. The pawls are received and retained in the pawl-holding portions but not physically secured to the pawl-holding portions. The method further includes urging the forward and reverse pawls outwardly from their respective pawl-holding portions. The method includes providing a single control member between the inner and outer surfaces which is rotatable about the first axis relative to the pawl-holding portions. The control member has at least one opening which extends completely therethrough. The method further includes rotating the control element relative to the pawl-holding portions about the first axis. The at least one opening allows the pawls to extend therethrough and be received within the pawl-receiving portions in a first angular position of the control element to fully lock the inner and outer members together to prevent relative rotation between the inner and outer members in either direction about the first axis. The control element maintains at least one of the pawls in a disengaged position in a second angular position of the control element in which one of the members is allowed to free-wheel relative to the other member during the rotation of the one of the members in a first direction about the first axis. The members are locked to each other in a second direction opposite the first direction about the first axis in the second angular position.

The method may further include rotating one of the members during the step of rotating the control element.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a top plan view of an overrunning coupling or clutch assembly constructed in accordance with one embodiment of the present invention;

FIG. 2 is a sectional view taken along lines 2-2 of FIG. 1;

FIG. 3 is a view similar to the view of FIG. 7 except an external notch plate of the assembly is hidden and wherein a slide plate lever may be moved clockwise to disengage a reverse strut;

FIG. 8 is a top plan view of an overrunning coupling or clutch assembly constructed in accordance with a second embodiment of the present invention;

FIG. 9 is a sectional view taken along lines 9-9 of FIG. 8;

FIG. 10 is an exploded, perspective view of an overrunning coupling or clutch assembly constructed in accordance with the second embodiment of the present invention with struts and springs removed for clarity;

FIG. 14 is a top plan view of an overrunning coupling or clutch assembly constructed in accordance with a third embodiment of the present invention;

FIG. 15 is a sectional view taken along lines 15-15 of FIG. 14;

FIG. 16 is an exploded, perspective view of an overrunning coupling or clutch assembly constructed in accordance with the third embodiment of the present invention with struts and springs removed for clarity;

FIG. 20 is a top plan view of an overrunning coupling or clutch assembly constructed in accordance with a fourth embodiment of the present invention;

FIG. 21 is a sectional view taken along lines 21-21 of FIG. 20;

FIG. 22 is an exploded, perspective view of an overrunning coupling or clutch assembly constructed in accordance with the fourth embodiment of the present invention with struts and springs removed for clarity;

FIG. 25 is a top plan view of an overrunning coupling or clutch assembly constructed in accordance with a fifth embodiment of the present invention;

FIG. 26 is a sectional view taken along lines 26-26 of FIG. 25;

FIG. 27 is an exploded, perspective view of an overrunning coupling or clutch assembly constructed in accordance with the fifth embodiment of the present invention with struts and springs removed for clarity;

FIG. 28 is a partially broken away, sectional view taken along lines 28-30-28-30 of FIG. 26 wherein the pocket plate is non-rotating, the slide plate is actuated in a clockwise direction to disengage the reverse strut and the notch plate rotates counter-clockwise in an overrun condition (i.e., one-way overrun condition);

FIG. 29 is a view similar to the view of FIG. 28 except the notch plate rotates clockwise and the forward strut locks (i.e., one-way lock condition); and FIG. 30 is a view similar to the views of FIGS. 28 and 29 wherein the slide plate is activated counter-clockwise to allow the reverse strut to engage, the notch plate rotates counter-clockwise until both struts are locked (i.e., the full lock condition).

DETAILED DESCRIPTION OF THE PREFERRED EMBODIMENTS

Figure 4:
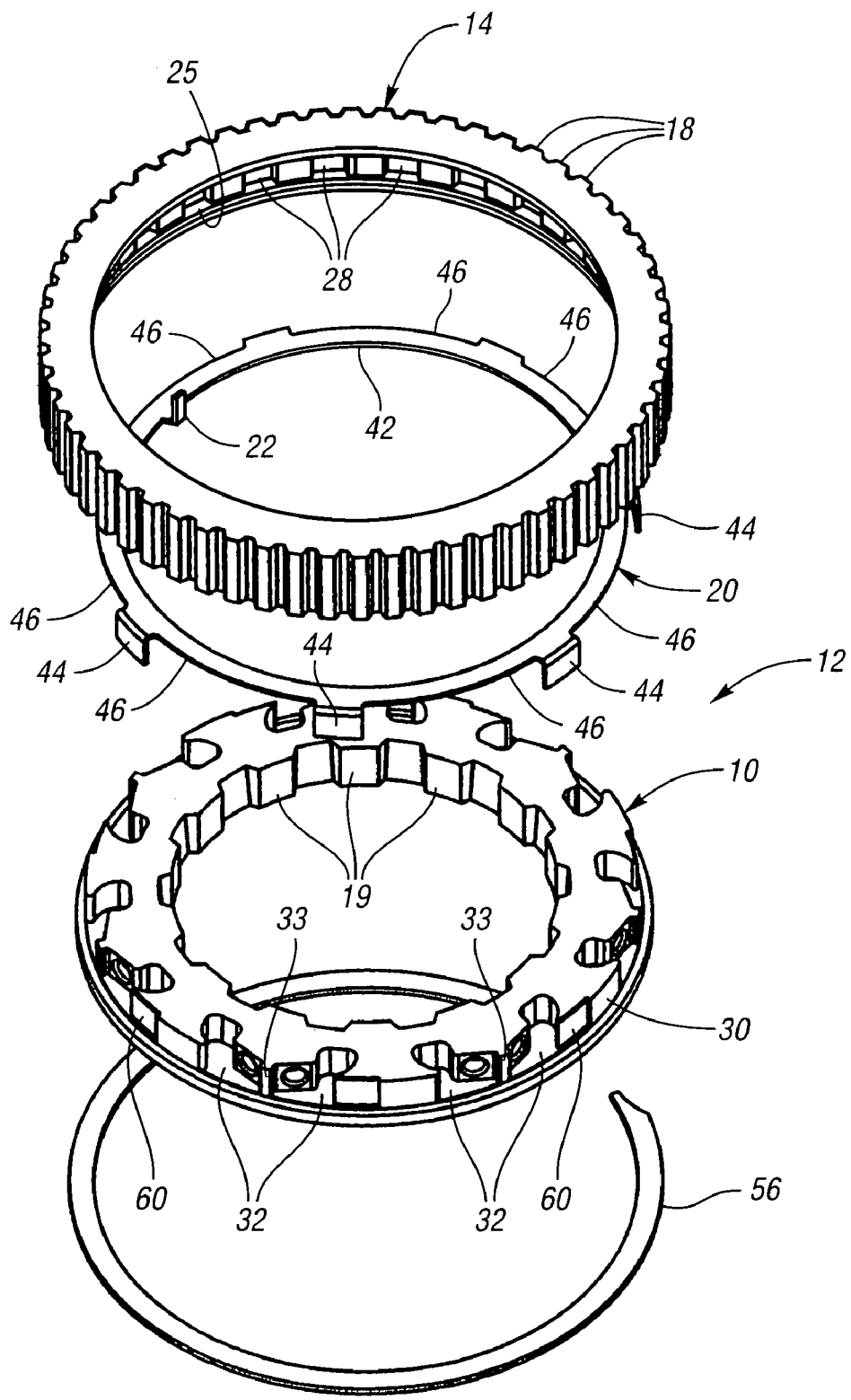
FIG. 4 is an exploded, perspective view of an overrunning coupling or clutch assembly constructed in accordance with one embodiment of the present invention with struts and springs removed for clarity.

FIGS. 1 and 2 show a pocket plate or inner member, generally indicated at 10, of a overrunning radial coupling or clutch assembly, generally indicated at 12, constructed in accordance with one embodiment of the present invention. An outer member or notch plate, generally indicated at 14, is mounted for rotation about a first axis 16 and is located adjacent the pocket plate 10 in radially inner and radially outer relationship. The notch plate 14 may be drivably connected to a source of torque (not shown). This driving connection is established by external splines 18 formed on the notch plate 14, which drivably engage splines on the source torque. The pocket plate 10 may be stationary or rotatable about the first axis 16 and is provided with internal splines 19.

Referring now to FIGS. 2 and 4, an actuator (not shown) may be drivably connected to a slide or control element or plate, generally indicated at 20, via a slide plate lever 22, which is connected to the control member or plate 20, thereby causing the control plate 20 to be adjusted angularly with respect to the first axis 16 (about which the plates 14 and 20 are rotatable, as shown in FIG. 2). The control plate 20 is disposed between the plates 10 and 14 for limited angular rotation relative to and between the plates 10 and 14.

Figure 5:
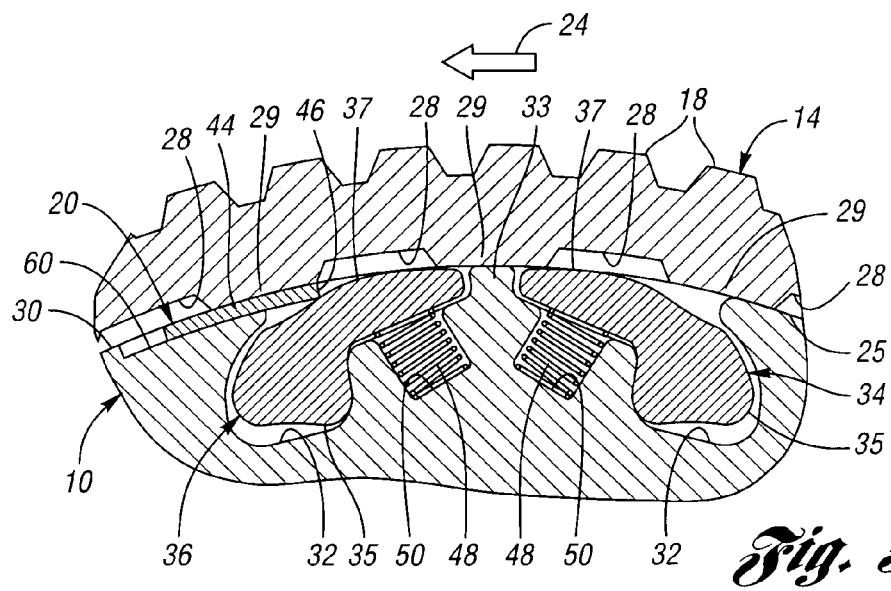
FIG. 5 is a partially broken away, sectional view taken along lines 5-7-5-7 of FIG. 2 wherein the internal pocket plate is non-rotating, the slide plate is actuated in a clockwise direction to disengage the reverse strut and the external notch plate rotates counter-clockwise in an overrun condition (i.e., one-way overrun condition)

The plate 14 can overrun or free-wheel in one angular direction about the axis 16 relative to the plate 10 as shown by arrow 24 in FIG. 5. The one-way free-wheeling motion is achieved in an operating mode when the actuator adjusts the angular position of the control plate 20 relative to the pocket plate 10 (via the lever 22) about the axis 16 to a first angular position (i.e., one-way overrun or disengaged position), as shown in FIG. 5.

Figure 6:
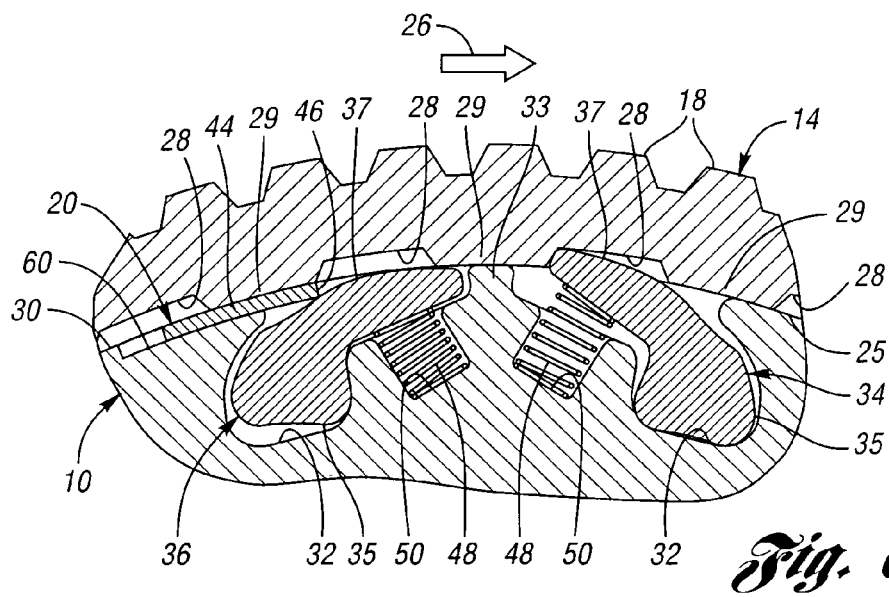
FIG. 6 is a view similar to the view of FIG. 5 except the notch plate rotates clockwise and the forward strut locks (i.e., one-way lock condition)

FIG. 6 illustrates a one-way lock condition in the first angular position of the control plate 20 wherein the plate 14 rotates relative to the plate 10 in the direction of the arrow 26.

Figure 7:
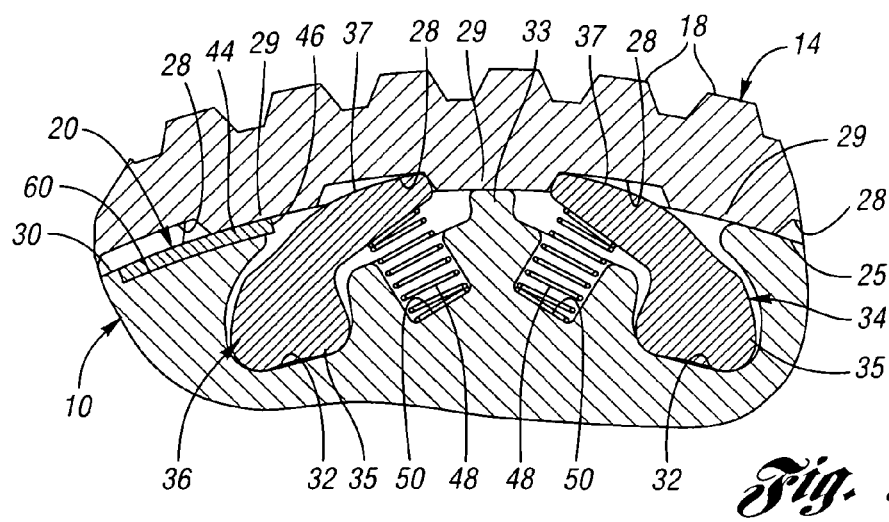
FIG. 7 is a view similar to the views of FIGS. 5 and 6 wherein the slide plate is activated counter-clockwise to allow the reverse strut to engage, the notch plate rotates counter-clockwise until both struts are locked (i.e., the full lock condition)

FIG. 7 illustrates a second angular position (i.e., fully locked or engaged position) of the control plate 20 relative to the pocket plate 10.

FIG. 4 illustrates the clutch or coupling assembly 12 in an exploded view. The notch plate 14 has an inner peripheral surface 25 with one or more notches 28 formed therein and separated by common walls 29, as shown in FIGS. 5-7. The pocket plate 10 is adapted to be received in the notch plate 14.

The pocket plate 10 has an outer peripheral surface 30 with one or more elongated recesses 32 formed therein. Adjacent recesses are separated by a common wall 33. Located intermediate the peripheral surfaces 25 and 30 of the plate 14 and the plate 10, respectively, is the control or slide plate 20.

There are preferably fourteen struts or pawls received and retained in fourteen recesses 32 in the pocket plate 10. Seven of the pawls are forward pawls, generally indicated at 34, for locking the plates 10 and 14 in the direction 26 (i.e., FIG. 6) about the axis 16 and seven of the struts are reverse struts, generally indicated at 36, opposed to their respective forward struts 34 for allowing one-way overrun in the direction 24 (i.e., FIG. 5) about the axis 16. Each recess 32 preferably receives and retains either one forward strut 34 or one reverse strut 36, which opposes its respective strut.

Each of the pawls 34 and 36 includes a lobed mounting end 35 and a locking end 37. Each mounting end 35 is designed to be held within its respective pawl-holding portion of the plate 10 while each locking end 37 is designed to be received within its respective pawl-receiving portion of the plate 14. While the drawing FIGS. 1-7 show both forward and reverse struts 34 and 36, respectively, held in the plate 10, one or both of the struts 34 and 36 could alternatively be held in the plate 14 as described herein below without departing from the scope of the present invention.

Referring to FIG. 4, the control plate 20 includes a ring portion 42 and seven control portions 44 which define seven elongated apertures 46 therebetween. The control portions 44 are equally spaced and arranged angularly about the axis 16. When the control plate 20 is appropriately positioned angularly about the axis 16, one aperture 46 will be disposed directly over a pair of adjacent recesses 32 (i.e., see FIG. 7). The apertures 46 and the notches 28 are sized so that the ends 37 of the pawls 34 and 36 can enter adjacent notches 28 (within the pawl-receiving portions) in the notch plate 14 and engage edges of the notches 28 to establish a locking action between the pawls 34 and 36 and the plate 14 that will lock the plate 14 and the plate 10 in both directions about the axis 16.

If the control plate 20 is rotated to a different angular position, as shown in FIG. 5, both pawls 34 and 36 rotate radially inwardly into their adjacent recesses 32. The pawl 36 is at least partially covered by one of the control portions 44 of the control plate 20 and is prevented from moving radially outwardly. The pawl 34 rotates inwardly due to its engagement with the inner peripheral surface 25 of the outer member 14. When the control plate 20 is thus positioned, the plate 14 can free-wheel, in the direction of the arrow 24 about the axis 16 with respect to the plate 10. In FIG. 6, the notch plate 14 rotates in the direction of arrow 26 and the forward strut 34 locks.

Although any suitable strut spring may be used with one embodiment of the invention, FIGS. 3 and 5-7 show strut coil springs 48 used in this embodiment of the invention. One spring 48 is located under each of the pawls 34 and 36 within recesses 50 formed in the recesses 32.

When the pocket plate 10 is received within the notch plate 14 with the control plate 20 therebetween, the plates 10 and 14 are held axially fast by retainer ring or snap-ring 56. The snap-ring 56 is received and retained in an external groove 58 formed in the notch plate 14, the groove 58 being seen in FIG. 2.

When assembled, the control portions 44 of the plate 20 are located within cavities 60 formed in the outer peripheral surface 30 of the pocket plate 10. The angularly spaced, outer peripheral control portions 44 are disposed in the cavities 60 so that the control plate 20 can slide angularly about the axis 16 of the assembly 12.

What follows is a detailed description of the second embodiment wherein parts of the second embodiment with the same or similar structure and/or function as those parts of the first embodiment have the same reference number but a single prime designation.

FIGS. 8 and 9 show a notch plate or inner member, generally indicated at 10', of a overrunning radial coupling or clutch assembly, generally indicated at 12', constructed in accordance with a second embodiment of the present invention. An outer member or pocket plate, generally indicated at 14', is mounted for rotation about a first axis 16' and is located adjacent the notch plate 10' in radially inner and radially outer relationship. The pocket plate 14' may be drivably connected to a source of torque (not shown). This driving connection is established by external splines 18' formed on the pocket plate 14', which drivably engage splines on the source torque. The notch plate 10' may be stationary or rotatable about the first axis 16' and is provided with internal splines 19'.

Referring now to FIG. 9, an actuator (not shown) may be drivably connected to a slide or control element or plate, generally indicated at 20', via a slide plate lever 22', which is connected to the control member or plate 20', thereby causing the control plate 20' to be adjusted angularly with respect to the first axis 16' (about which the plates 14' and 20' are rotatable, as shown in FIG. 9). The control plate 20' is disposed between the plates 10' and 14' for limited angular rotation relative to and between the plates 10' and 14'.

Figure 11:
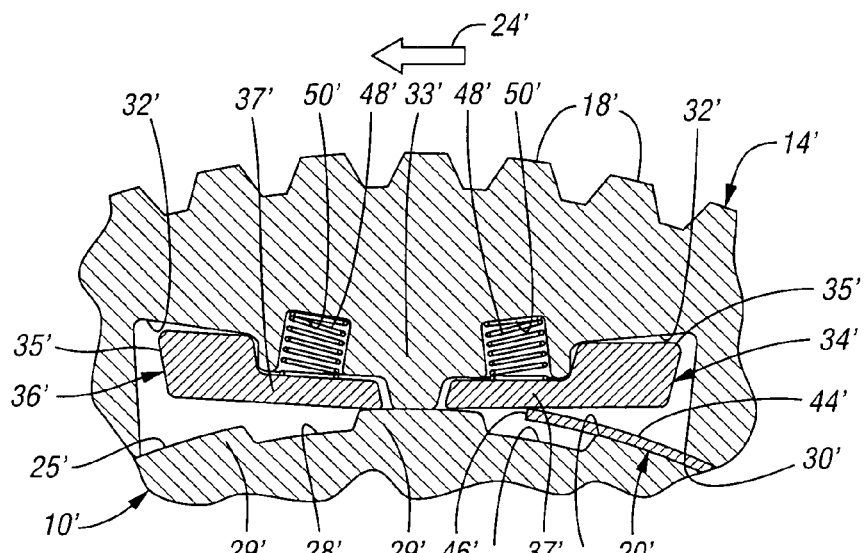
FIG. 11 is a partially broken away, sectional view taken along lines 11-13-11-13 of FIG. 9 wherein the internal notch plate is non-rotating, the slide plate is actuated in a counter-clockwise direction to disengage the forward strut and the external pocket plate rotates counter-clockwise in an overrun condition (i.e., one-way overrun condition)

The plate 14' can overrun or free-wheel in one angular direction about the axis 16' relative to the plate 10' as shown by arrow 24' in FIG. 11. The one-way free-wheeling motion is achieved in an operating mode when the actuator adjusts the angular position of the control plate 20' relative to the notch plate 10' (via the lever 22') about the axis 16' to a first angular position (i.e., one-way overrun or disengaged position), as shown in FIG. 11.

FIG. 11 illustrates a one-way lock condition in the first angular position of the control plate 20' wherein the plate 14' rotates relative to the plate 10' in the direction of the arrow 26'.

Figure 13:
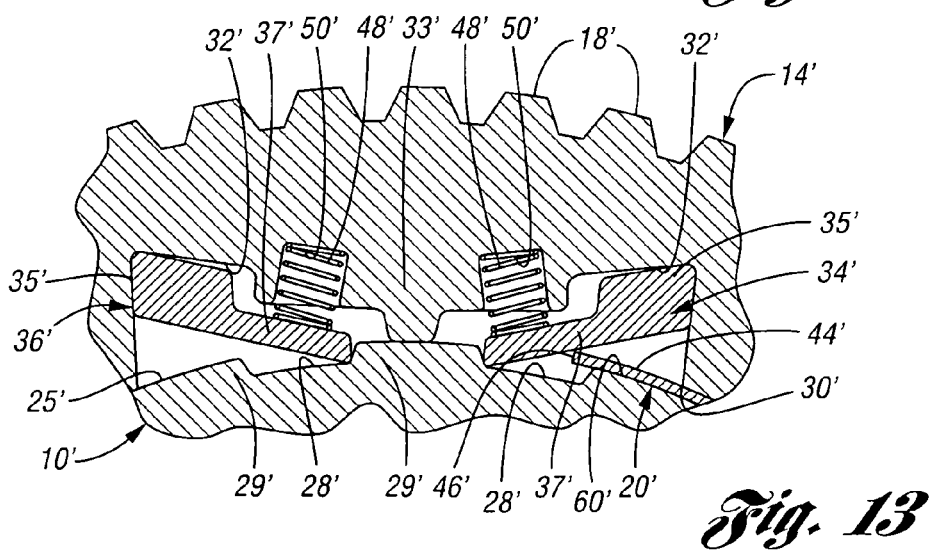
FIG. 13 is a view similar to the views of FIGS. 11 and 12 wherein the slide plate is activated clockwise to allow the forward strut to engage, the pocket plate rotates counter-clockwise until both struts are locked (i.e., the full lock condition)

FIG. 13 illustrates a second angular position (i.e., fully locked or engaged position) of the control plate 20' relative to the notch plate 10'.

FIG. 10 illustrates the clutch or coupling assembly 12' in an exploded view. The notch plate 10' has an outer peripheral surface 25' with one or more notches 28' formed therein and separated by common walls 29', as further shown in FIGS. 11-13. The notch plate 10' is adapted to be received in the pocket plate 14'.

The pocket plate 14' has an inner peripheral surface 30' with one or more elongated recesses 32' formed therein. Adjacent recesses are separated by a common wall 33'. Located intermediate the peripheral surfaces 25' and 30' of the plate 10' and the plate 14', respectively, is the control or slide plate 20'.

There are preferably fourteen struts or pawls received and retained in fourteen recesses 32' in the pocket plate 14'. Seven of the pawls are forward pawls, generally indicated at 34', for locking the plates 10' and 14' and in the direction 26' (i.e., FIG. 12) about the axis 16' and seven of the struts are reverse struts, generally indicated at 36', opposed to their respective forward struts 34' for allowing one-way overrun in the direction 24' (i.e., FIG. 11) about the axis 16'. Each recess 32' preferably receives and retains either one forward strut 34' or one reverse strut 36', which opposes its respective strut.

Each of the pawls 34' and 36' includes a rectangular mounting end 35' and a locking end 37'. Each mounting end 35' is designed to be held within its respective pawl-holding portion of the plate 14' while each locking end 37' is designed to be received within its respective pawl-receiving portion of the plate 10'.

Referring to FIG. 10, the control plate 20' includes a ring portion 42' and seven control portions 44' which define seven elongated apertures 46' therebetween. The control portions 44' are equally spaced and arranged angularly about the axis 16'. When the control plate 20' is appropriately positioned angularly about the axis 16', one aperture 46' will be disposed directly over a pair of adjacent recesses 32' (i.e., see FIG. 13). The apertures 46' and the notches 28' are sized so that the ends 37' of the pawls 34' and 36' can enter adjacent notches 28' (within the pawl-receiving portions) in the notch plate 10' and engage edges of the notches 28' to establish a locking action between the pawls 34' and 36' and the plate 10' that will lock the plate 14' and the plate 10' in both directions about the axis 16'.

Figure 12:
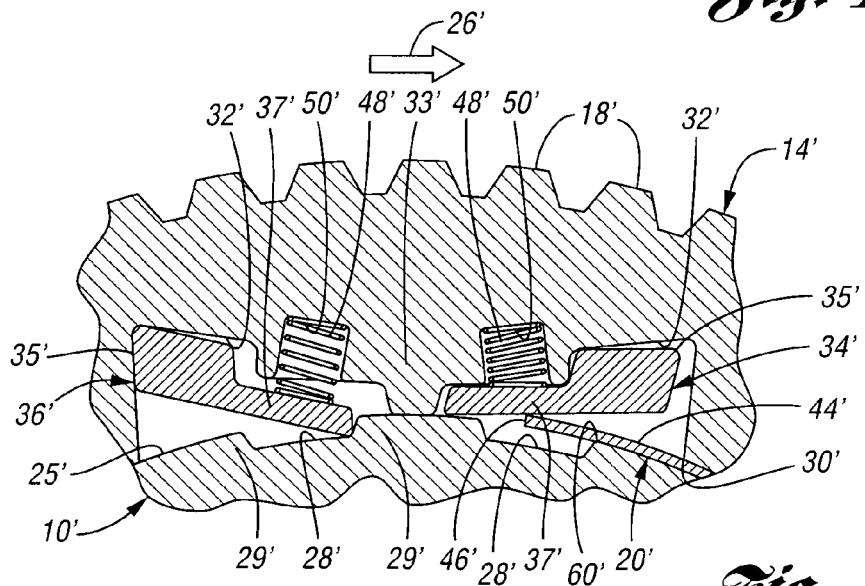
FIG. 12 is a view similar to the view of FIG. 11 except the pocket plate rotates clockwise and the reverse strut locks (i.e., one-way lock condition)

If the control plate 20' is rotated to a different angular position, as shown in FIG. 11, both pawls 34' and 36' rotate radially outwardly into their adjacent recesses 32'. The pawl 34' is at least partially covered by one of the control portions 44' of the control plate 20' and is prevented from moving radially inwardly. The pawl 36' rotates outwardly due to its engagement with the outer peripheral surface 25' of the inner member 10'. When the control plate 20' is thus positioned, the plate 14' can free-wheel, in the direction of the arrow 24' about the axis 16' with respect to the plate 10'. In FIG. 12, the pocket plate 14' rotates in the direction of arrow 26' and the reverse strut 36' locks.

Although any suitable strut spring can be used with the invention, FIGS. 11-13 show strut coil springs 48' used in this embodiment of the invention. One spring 48' is located over each of the pawls 34' and 36' within recesses 50' formed in the recesses 32'.

When the notch plate 10' is received within the pocket plate 14' with the control plate 20' therebetween, the plates 10' and 14' are held axially fast by retainer ring or snap-ring 56'. The snap-ring 56' is received and retained in an external groove 58' formed in the pocket plate 14', the groove 58' being seen in FIG. 9.

When assembled, the control portions 44' of the plate 20' are located within cavities 60' formed in the outer peripheral surface 25' of the notch plate 10'. The angularly spaced, outer peripheral control portions 44' are disposed in the cavities 60' so that the control plate 20' can slide angularly about the axis 16' of the assembly 12'.

What follows is a detailed description of the third embodiment wherein parts of the third embodiment with the same or similar structure and/or function as those parts of the first two embodiments have the same reference number but a double prime designation.

FIGS. 14 and 15 show an external plate or inner member, generally indicated at 10", of a overrunning radial coupling or clutch assembly, generally indicated at 12", constructed in accordance with a third embodiment of the present invention. An outer member or plate, generally indicated at 14", is mounted for rotation about a first axis 16" and is located adjacent the inner plate 10" in radially inner and radially outer relationship. The outer plate 14" may be drivably connected to a source of torque (not shown). This driving connection is established by external splines 18" formed on the outer plate 14", which drivably engage splines on the source torque. The inner plate 10" may be stationary or rotatable about the first axis 16" and is provided with internal splines 19".

Referring now to FIGS. 15 and 16, an actuator (not shown) may be drivably connected to a slide or control element or plate, generally indicated at 20", via a slide plate lever 22", which is connected to the control member or plate 20", thereby causing the control plate 20" to be adjusted angularly with respect to the first axis 16" (about which the plates 14" and 20" are rotatable, as shown in FIG. 15). The control plate 20" is disposed between the plates 10" and 14" for limited angular rotation relative to and between the plates 10" and 14".

Figure 17:
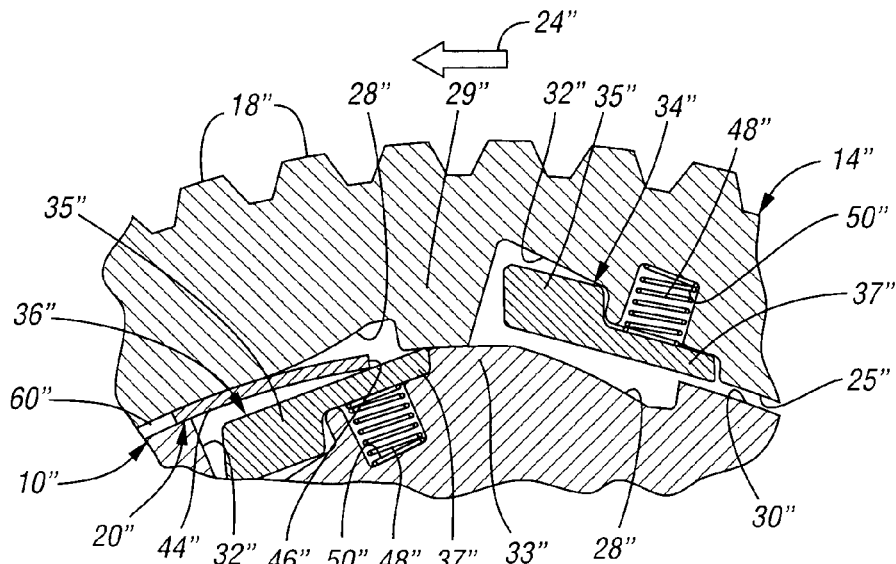
FIG. 17 is a partially broken away, sectional view taken along lines 17-19-17-19 of FIG. 15 wherein the external plate is non-rotating, the slide plate is actuated in a clockwise direction to disengage the reverse strut and the external plate rotates counter-clockwise in an overrun condition (i.e., one-way overrun condition)

The plate 14" can overrun or free-wheel in one angular direction about the axis 16" relative to the plate 10" as shown by arrow 24" in FIG. 17. The one-way free-wheeling motion is achieved in an operating mode when the actuator adjusts the angular position of the control plate 20" relative to the inner plate 10" (via the lever 22") about the axis 16" to a first angular position (i.e., one-way overrun or disengaged position), as shown in FIG. 17.

Figure 18:
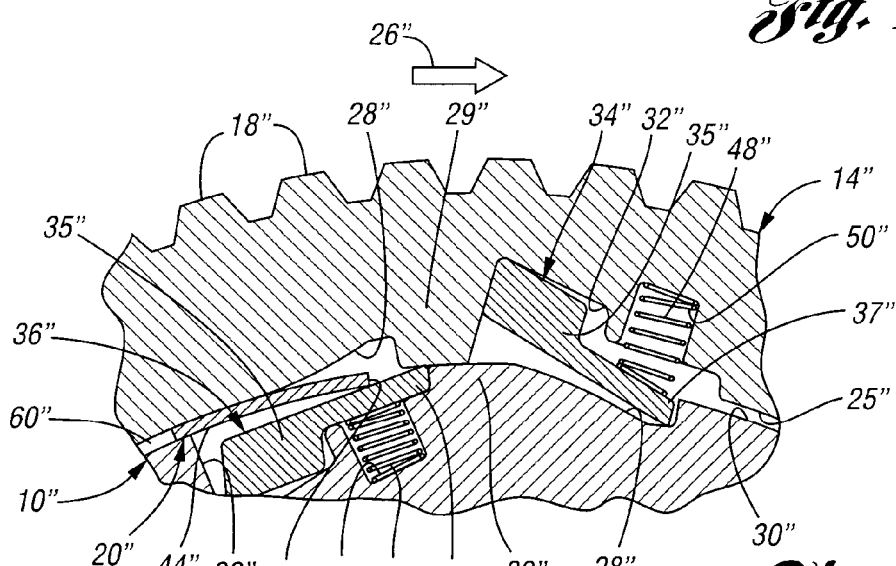
FIG. 18 is a view similar to the view of FIG. 17 except the external plate rotates clockwise and the forward strut locks (i.e., one-way lock condition)

FIG. 18 illustrates a one-way lock condition in the first angular position of the control plate 20" wherein the plate 14" rotates relative to the plate 10" in the direction of the arrow 26".

Figure 19:
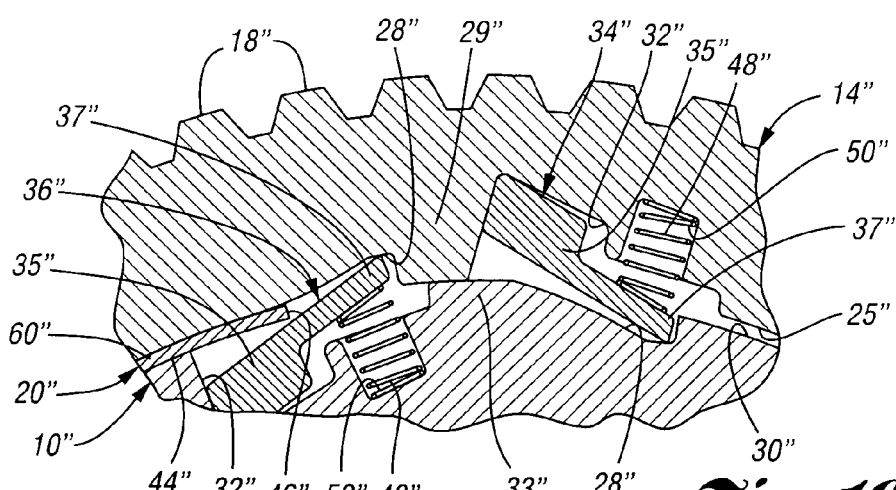
FIG. 19 is a view similar to the views of FIGS. 17 and 18 wherein the slide plate is activated counter-clockwise to allow the reverse strut to engage, the external plate rotates counter-clockwise until both struts are locked (i.e., the full lock condition)

FIG. 19 illustrates a second angular position (i.e., fully locked or engaged position) of the control plate 20" relative to the inner plate 10".

FIG. 16 illustrates the clutch or coupling assembly 12" in an exploded view. The outer plate 14" has an inner peripheral surface 25" with one or more sloped notches 28" formed therein and one or more elongated recesses 32" formed therein separated by common walls 29", as shown in FIGS. 17-19. The inner plate 10" is adapted to be received in the outer plate 14".

The inner plate 10" has an outer sloped peripheral surface 30" with one or more elongated recesses 32" formed therein and one or more notches 28" formed therein. Notches 28" adjacent to the recesses 32" are separated by a common wall 33". Located intermediate the peripheral surfaces 25" and 30" of the plate 14" and the plate 10", respectively, is the control or slide plate 20".

There are preferably fourteen struts or pawls received and retained in fourteen recesses 32" in the plates 10" and 14". Seven of the pawls are forward pawls, generally indicated at 34", positioned in the plate 14" for locking the plates 10" and 14" in the direction 26" (i.e., FIG. 18) about the axis 16" and seven of the struts are reverse struts, generally indicated at 36", positioned in the plate 10" adjacent to their respective forward struts 34" for allowing one-way overrun in the direction 24" (i.e., FIG. 17) about the axis 16". Each recess 32" preferably receives and retains either one forward strut 34" or one reverse strut 36", adjacent its respective opposite strut.

Each of the pawls 34" and 36" includes a rectangular mounting end 35" and a locking end 37". Each mounting end 35" is designed to be held within its respective pawl-holding portion of either the plate 10" or the plate 14" while each locking end 37" is designed to be received within its respective pawl-receiving portion of either the plate 14" or the plate 10".

Referring to FIG. 16, the control plate 20" includes a ring portion 42" and seven control portions 44" which define seven elongated apertures 46". The control portions 44" are equally spaced and arranged angularly about the axis 16". When the control plate 20" is appropriately positioned angularly about the axis 16", one aperture 46" will be disposed directly over a pair of recesses 32" on the plates 10" and 14" (i.e., see FIG. 19). The apertures 46" and the notches 28" are sized so that the ends 37" of the pawls 34" and 36" can enter notches 28" (within the pawl-receiving portions) in the plates 10" and 14", respectively, and engage edges of the notches 28" to establish a locking action between the pawls 34" and 36" and the plates 10" and 14", respectively, that will lock the plate 14" and the plate 10" in both directions about the axis 16".

If the control plate 20" is rotated to a different angular position, as shown in FIG. 17, the pawl 34" rotates radially outwardly and the pawl 36" rotates radially inwardly into their adjacent recesses 32". The pawl 36" is at least partially covered by one of the control portions 44" of the control plate 20" and is prevented from moving radially outwardly. The pawl 34" rotates radially outwardly due to its engagement with the outer peripheral surface 30" of the inner member 10". When the control plate 20" is thus positioned, the plate 14" can free-wheel, in the direction of the arrow 24" about the axis 16" with respect to the plate 10". In FIG. 18, the outer plate 14" rotates in the direction of arrow 26" and the forward strut 34" locks.

Although any suitable strut spring can be used with the invention, FIGS. 17-19 show strut coil springs 48" used in this embodiment of the invention. One spring 48" is located under each of the pawls 34" and 36" within recesses 50" formed in the recesses 32".

When the inner plate 10" is received within the outer plate 14" with the control plate 20" therebetween, the plates 10" and 14" are held axially fast by a retainer ring or snap-ring 56". The snap-ring 56" is received and retained in an external groove 58" formed in the outer plate 14", the groove 58" being seen in FIG. 15.

When assembled, the control portions 44" of the plate 20" are located within cavities 60" formed in the outer peripheral surface 30" of the plate 10". The angularly spaced, outer peripheral control portions 44" are disposed in the cavities 60" so that the control plate 20" can slide angularly about the axis 16" of the assembly 12".

What follows is a detailed description of the fourth embodiment wherein parts of the fourth embodiment with the same or similar structure and/or function as those parts of the first three embodiments have the same reference number but a triple prime designation.

FIGS. 20 and 21 show a pocket plate or inner member, generally indicated at 10''', of a overrunning radial coupling or clutch assembly, generally indicated at 12''', constructed in accordance with one embodiment of the present invention. An outer member or notch plate, generally indicated at 14''', is mounted for rotation about a first axis 16''' and is located adjacent the pocket plate 10''' in radially inner and radially outer relationship. The notch plate 14''' may be drivably connected to a source of torque (not shown). This driving connection is established by external splines 18''' formed on the notch plate 14''', which drivably engage splines on the source torque. The pocket plate 10''' may be stationary or rotatable about the first axis 16''' and is provided with internal splines 19'''.

Referring now to FIGS. 21 and 22, an actuator (not shown) may be drivably connected to a slide or control element or plate, generally indicated at 20''', via a slide plate lever 22''', which is connected to the control member or plate 20''', thereby causing the control plate 20''' to be adjusted angularly with respect to the first axis 16''' (about which the plates 14''' and 20''' are rotatable, as shown in FIG. 21). The control plate 20''' is disposed between the plates 10''' and 14''' for limited angular rotation relative to and between the plates 10''' and 14'''.

Figure 23:
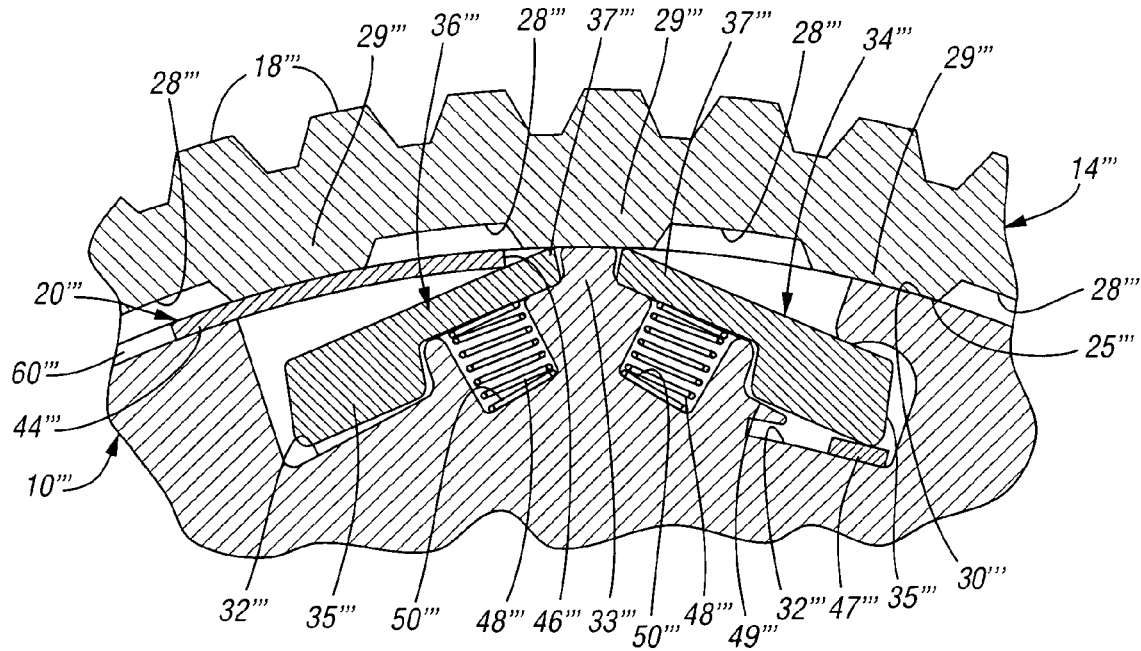
FIG. 23 is a partially broken away, sectional view taken along lines 23-24-23-24 of FIG. 21 wherein the pocket plate is non-rotating, the slide plate is actuated in a clockwise direction to disengage the reverse strut and the notch plate rotates counter-clockwise in an overrun condition (i.e., one-way overrun condition)

The plate 14''' can overrun or free-wheel in a counter-clockwise direction about the axis 16''' relative to the plate 10''' as shown in FIG. 23. The one-way free-wheeling motion is achieved in an operating mode when the actuator adjusts the angular position of the control plate 20''' relative to the pocket plate 10''' (via the lever 22''') about the axis 16''' to a first angular position (i.e., one-way overrun or disengaged position), as shown in FIG. 23.

Figure 24:
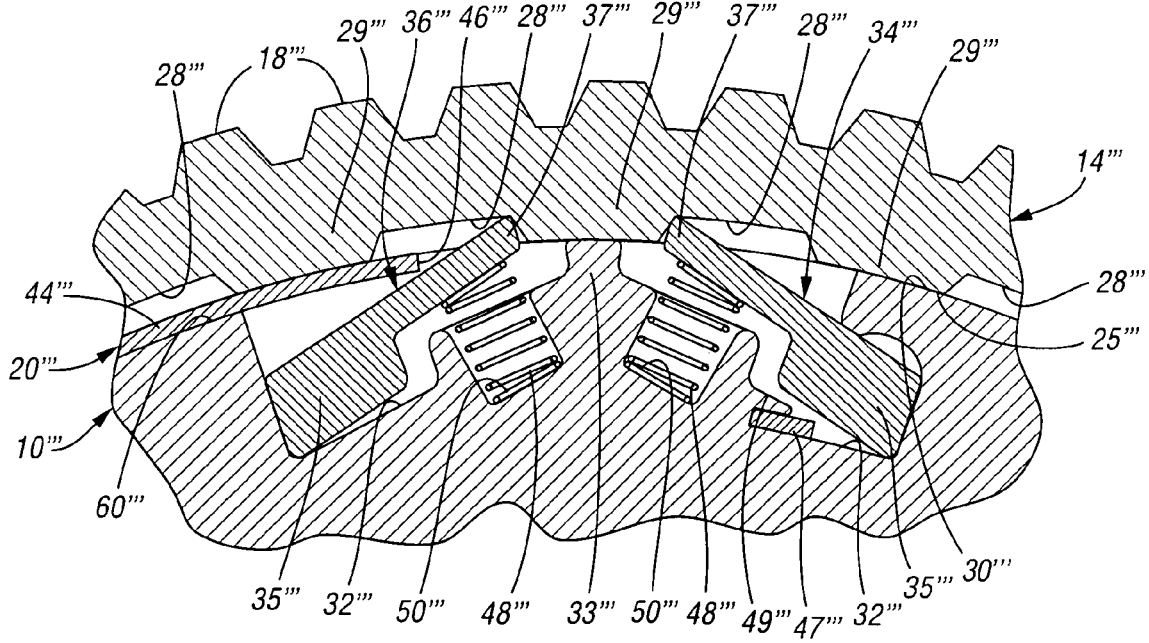
FIG. 24 is a view similar to the view of FIG. 23 wherein the slide plate is activated counter-clockwise to allow the reverse strut to engage, the notch plate rotates counter-clockwise until both struts are locked (i.e., the full lock condition)

FIG. 24 illustrates a second angular position (i.e., fully locked or engaged position) of the control plate 20''' relative to the pocket plate 10'''.

FIG. 22 illustrates the clutch or coupling assembly 12''' in an exploded view. The notch plate 14''' has an inner peripheral surface 25''' with one or more notches 28''' formed therein and separated by common walls 29''', as shown in FIGS. 23-24. The pocket plate 10''' is adapted to be received in the notch plate 14'''.

The pocket plate 10''' has an outer peripheral surface 30''' with one or more elongated recesses 32''' formed therein. Adjacent recesses are separated by a common wall 33'''. Located intermediate the peripheral surfaces 25''' and 30''' of the plate 14''' and the plate 10''', respectively, is the control or slide plate 20'''.

There are preferably fourteen struts or pawls received and retained in fourteen recesses 32''' in the pocket plate 10'''. Seven of the pawls are forward pawls, generally indicated at 34''', for locking the plates 10''' and 14''' and seven of the struts are reverse struts, generally indicated at 36''', opposed to their respective forward struts 34''' for allowing one-way overrun in the counter-clockwise direction (i.e., FIG. 23) about the axis 16'''. Each recess 32''' preferably receives and retains either one forward strut 34''' or one reverse strut 36''', which opposes its respective strut.

Each of the pawls 34''' and 36''' includes a rectangular mounting end 35''' and a locking end 37'''. Each mounting end 35''' is designed to be held within its respective pawl-holding portion of the plate 10''' while each locking end 37''' is designed to be received within its respective pawl-receiving portion of the plate 14'''.

Referring to FIG. 22, the control plate 20''' includes a ring portion 42''', seven control portions 44''' which define seven elongated apertures 46''' and seven actuator portions 47'''. The control portions 44''' are equally spaced and arranged angularly about the axis 16'''. When the control plate 20''' is appropriately positioned angularly about the axis 16''', one aperture 46''' will be disposed directly over a pair of adjacent recesses 32''' (i.e., see FIG. 24). The apertures 46''' and the notches 28''' are sized so that the ends 37''' of the pawls 34''' and 36''' can enter adjacent notches 28''' (within the pawl-receiving portions) in the notch plate 14''' and engage edges of the notches 28''' to establish a locking action between the pawls 34''' and 36''' and the plate 14''' that will lock the plate 14''' and the plate 10''' in both directions about the axis 16'''.

The actuator portions 47''' are also equally spaced and arranged angularly about the axis 16'''. When the control plate 20''' is appropriately positioned angularly about the axis 16''', one actuator portion 47''' will be disposed under a ridge portion 49''' of the plate 10''' away from the lower surface of the mounting end 35''' of each forward strut 34''' (i.e., see FIG. 24).

If the control plate 20'''' is rotated to a different angular position, as shown in FIG. 23, both pawls 34''' and 36''' rotate radially inwardly into their adjacent recesses 32'''. The pawl 36''' is at least partially covered by one of the control portions 44''' of the control plate 20''' and is prevented from moving radially outwardly. The pawl 34''' rotates radially inwardly due to its engagement with the inner peripheral surface 25''' of the outer member 14''' as well as its engagement with the actuator portion 47''' at the lower surface of its mounting end 35'''. When the control plate 20''' is thus positioned, the plate 14''' can free-wheel about the axis 16''' with respect to the plate 10'''.

Although any suitable strut spring can be used with the invention, FIGS. 23 and 24 show strut coil springs 48''' used in this embodiment of the invention. One spring 48''' is located under each of the pawls 34''' and 36''' within recesses 50''' formed in the recesses 32'''.

When the pocket plate 10''' is received within the notch plate 14''' with the control plate 20''' therebetween, the plates 10''' and 14''' are held axially fast by retainer ring or snap-ring 56'''. The snap-ring 56''' is received and retained in an external groove 58''' formed in the notch plate 14''', the groove 58''' being seen in FIG. 21.

When assembled, the control portions 44''' of the plate 20''' are located within cavities 60''' formed in the outer peripheral surface 30''' of the pocket plate 10'''. The angularly spaced, outer peripheral control portions 44''' are disposed in the cavities 60''' so that the control plate 20''' can slide angularly about the axis 16''' of the assembly 12'''.

What follows is a detailed description of the fifth embodiment wherein parts of the fifth embodiment with the same or similar structure and/or function as those parts of the first four embodiments have the same reference number but a quadruple prime designation.

FIGS. 25 and 26 show a pocket plate or inner member, generally indicated at 10'''', of a overrunning radial coupling or clutch assembly, generally indicated at 12'''', constructed in accordance with one embodiment of the present invention. An outer member or notch plate, generally indicated at 14'''', is mounted for rotation about a first axis 16'''' and is located adjacent the pocket plate 10'''' in radially inner and radially outer relationship. The notch plate 14'''' may be drivably connected to a source of torque (not shown). This driving connection is established by external splines 18'''' formed on the notch plate 14'''', which drivably engage splines on the source torque. The pocket plate 10'''' may be stationary or rotatable about the first axis 16'''' and is provided with internal splines 19''''.

Referring now to FIGS. 26 and 27, an actuator (not shown) may be drivably connected to a slide or control element or plate, generally indicated at 20'''', via a slide plate lever 22'''', which is connected to the control member or plate 20'''', thereby causing the control plate 20'''' to be adjusted angularly with respect to the first axis 16'''' (about which the plates 14'''' and 20'''' are rotatable, as shown in FIG. 26). The control plate 20'''' is disposed between the plates 10'''' and 14'''' for limited angular rotation relative to and between the plates 10'''' and 14''''.

The plate 14'''' can overrun or free-wheel in one angular direction about the axis 16'''' relative to the plate 10'''' as shown by arrow 24'''' in FIG. 28. The one-way free-wheeling motion is achieved in an operating mode when the actuator adjusts the angular position of the control plate 20'''' relative to the pocket plate 10'''' (via the lever 22'''') about the axis 16'''' to a first angular position (i.e., one-way overrun or disengaged position), as shown in FIG. 28.

FIG. 29 illustrates a one-way lock condition in the first angular position of the control plate 20'''' wherein the plate 14'''' rotates relative to the plate 10'''' in the direction of the arrow 26''''.

FIG. 30 illustrates a second angular position (i.e., fully locked or engaged position) of the control plate 20'''' relative to the pocket plate 10''''.

FIG. 27 illustrates the clutch or coupling assembly 12'''' in an exploded view. The notch plate 14'''' has an inner peripheral surface 25'''' with one or more notches 28'''' formed therein and separated by common walls 29'''', as shown in FIGS. 28-30. The pocket plate 10'''' is adapted to be received in the notch plate 14 ''''.

The pocket plate 10'''' has an outer peripheral surface 30'''' with one or more elongated recesses 32'''' formed therein. Adjacent recesses are separated by a common wall 33''''. Located intermediate the peripheral surfaces 25'''' and 30'''' of the plate 14'''' and the plate 10'''', respectively, is the control or slide plate 20''''.

There are preferably fourteen struts or pawls received and retained in fourteen recesses 32'''' in the pocket plate 10''''. Seven of the pawls are forward pawls, generally indicated at 34'''', for locking the plates 10'''' and 14'''' in the direction 26'''' (i.e., FIG. 29) about the axis 16'''' and seven of the struts are reverse struts, generally indicated at 36'''', opposed to their respective forward struts 34'''' for allowing one-way overrun in the direction 24'''' (i.e., FIG. 28) about the axis 16''''. Each recess 32'''' preferably receives and retains either one forward strut 34'''' or one reverse strut 36'''', which opposes its respective strut.

Each of the pawls 34'''' and 36'''' includes a rectangular mounting end 35'''' and a locking end 37''''. Each mounting end 35'''' is designed to be held within its respective pawl-holding portion of the plate 10'''' while each locking end 37'''' is designed to be received within its respective pawl-receiving portion of the plate 14''''.

Referring to FIG. 27, the control plate 20'''' includes a ring portion 42'''' and seven control portions 44'''' which define seven elongated apertures 46''''. The control portions 44'''' are equally spaced and arranged angularly about the axis 16''''. When the control plate 20'''' is appropriately positioned angularly about the axis 16'''', one aperture 46'''' will be disposed directly over a pair of adjacent recesses 32'''' (i.e., see FIG. 30). The apertures 46'''' and the notches 28'''' are sized so that the ends 37'''' of the pawls 34'''' and 36'''' can enter adjacent notches 28'''' (within the pawl-receiving portions) in the notch plate 14'''' and engage edges of the notches 28'''' to establish a locking action between the pawls 34'''' and 36'''' and the plate 14'''' that will lock the plate 14'''' and the plate 10'''' in both directions about the axis 16''''.

If the control plate 20'''' is rotated to a different angular position, as shown in FIG. 28, both pawls 34'''' and 36'''' rotate radially inwardly into their adjacent recesses 32''''. The pawl 36'''' is at least partially covered by one of the control portions 44'''' of the control plate 20'''' and is prevented from moving radially outwardly. The pawl 34'''' rotates radially inwardly due to its engagement with the inner peripheral surface 25'''' of the outer member 14''''. When the control plate 20'''' is thus positioned, the plate 14'''' can free-wheel, in the direction of the arrow 24'''' about the axis 16'''' with respect to the plate 10''''. In FIG. 29, the notch plate 14'''' rotates in the direction of arrow 26'''' and the forward strut 34'''' locks.

Although any suitable strut spring can be used with the invention, FIGS. 28-30 show strut coil springs 48'''' used in this embodiment of the invention. One spring 48'''' is located under each of the pawls 34'''' and 36'''' within recesses 50'''' formed in the recesses 32''''.

When the pocket plate 10'''' is received within the notch plate 14'''' with the control plate 20'''' therebetween, the plates 10'''' and 14'''' are held axially fast by a retainer ring or snap-ring 56''''. The snap-ring 56'''' is received and retained in an external groove 58'''' formed in the notch plate 14'''', the groove 58'''' being seen in FIG. 26.

When assembled, the control portions 44'''' of the plate 20'''' are located within cavities 60'''' formed in the outer peripheral surface 30'''' of the pocket plate 10''''. The angularly spaced, outer peripheral control portions 44'''' are disposed in the cavities 60'''' so that the control plate 20'''' can slide angularly about the axis 16'''' of the assembly 12''''.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An overrunning radial coupling assembly comprising:

an inner member having an outer peripheral surface;

an outer member having an inner peripheral surface adjacent the outer peripheral surface in radially inner and radially outer relationship, at least one of the members being mounted for rotation about a first axis;

pawl-receiving portions and pawl-holding portions formed on the members;

at least one free-floating, forward pawl and at least one free-floating, reverse pawl adjacent to the at least one forward pawl, the pawls being received and retained in the pawl-holding portions but not physically secured to the pawl-holding portions, the forward and reverse pawls being movable between an engaged position between the pawl-receiving and pawl-holding portions and a disengaged position in which one of the members is permitted to free-wheel relative to the other of the members;

a set of biasing members carried by the pawl-holding portions and urging the forward and reverse pawls outwardly from their respective pawl-holding portions; and a single control element mounted for controlled, shifting movement between the surfaces relative to the pawl-holding portions and operable to control position of at least one of the pawls, the control element having at least one opening which extends completely therethrough to allow the forward and reverse pawls to extend therethrough at the same time to the engaged position in a first position of the control element to fully lock the inner and outer members together to prevent relative rotation between the inner and outer members in either direction about the first axis and wherein the control element maintains at least one of the pawls in its disengaged position in a second position of the control element.

2. The assembly as claimed in claim 1, wherein the control element allows the at least one forward pawl to extend therethrough to one of the pawl-receiving portions in the second position to lock the inner and outer members together in a first direction about the first axis but not in a second direction opposite the first direction about the first axis.

3. The assembly as claimed in claim 2, wherein relative rotation between the outer member and the inner member in the second direction about the first axis in the second position of the control element causes the pawl-receiving portions to act against the at least one forward pawl to move the at least one forward pawl towards its disengaged position against the urging of its biasing member to permit free-wheeling.

4. The assembly as claimed in claim 1, wherein the forward and reverse pawls are received and retained in same member.

5. The assembly as claimed in claim 4, wherein the forward and reverse pawls are received and retained in the inner member.

6. The assembly as claimed in claim 4, wherein the forward and reverse pawls are received and retained in the outer member.

7. The assembly as claimed in claim 1, wherein the at least one forward pawl and the at least one reverse pawl extend through the same opening in the control element in the engaged position.

8. The assembly as claimed in claim 1, wherein a plurality of adjacent notches are formed in the inner peripheral surface and wherein one forward pawl and one reverse pawl engage adjacent notches in the inner peripheral surface in the engaged position.

9. The assembly as claimed in claim 1 further comprising an operating member operatively connected to the control element to selectively shift the control element between its first and second positions.

10. The assembly as claimed in claim 1, wherein the control element comprises a plate-like member.

11. The assembly as claimed in claim 1, the inner and outer members comprise plate-like members.

12. The assembly as claimed in claim 1, wherein the forward and reverse pawls are received and retained in different members.

13. The assembly as claimed in claim 1, wherein the control element includes at least one control portion which urges the at least one forward pawl toward its engaged position in the first position of the control element.

14. An overrunning radial coupling assembly comprising:
an inner member having an outer peripheral surface;
an outer member having an inner peripheral surface adjacent the outer peripheral surface in radially inner and radially outer relationship, at least one of the members being mounted for rotation about a first axis;
pawl-receiving portions and pawl-holding portions formed on the members;
at least one free-floating, forward pawl and at least one free-floating, reverse pawl adjacent to the at least one forward pawl, the pawls being received and retained in the pawl-holding portions but not physically secured to the pawl-holding portions, the forward and reverse pawls being movable between an engaged position between the pawl-receiving and pawl-holding portions and a disengaged position in which one of the members is permitted to free-wheel relative to the other of the members; and
a single control element mounted for controlled rotation about the first axis relative to the pawl-holding portions between first and second angular positions between the surfaces and being operable to control position of at least one of the pawls, the control element having at least one opening which extends completely therethrough to allow the forward and reverse pawls to extend therethrough at the same time to the engaged position in the first angular position of the control element to fully lock the inner and outer members together to prevent relative rotation between the inner and outer members in either direction about the first axis and wherein the control element maintains at least one of the pawls in its disengaged position in the second angular position of the control element.

15. The assembly as claimed in claim 14, wherein the control element allows the at least one forward pawl to extend therethrough to one of the pawl-receiving portions in the second angular position to lock the inner and outer members together in a first direction about the first axis but not in a second direction opposite the first direction about the first axis.

16. The assembly as claimed in claim 15, wherein relative rotation between the outer member and the inner member in the second direction about the first axis in the second angular position of the control element causes the pawl-receiving portions to act against the at least one forward pawl to move the at least one forward pawl towards its disengaged position to permit free-wheeling.

17. The assembly as claimed in claim 14, wherein the forward and reverse pawls are received and retained in the same member.

18. The assembly as claimed in claim 17, wherein the forward and reverse pawls are received and retained in the inner member.

19. The assembly as claimed in claim 17, wherein the forward and reverse pawls are received and retained in the outer member.

20. The assembly as claimed in claim 14, wherein the at least one forward pawl and the at least one reverse pawl extend through the same opening in the control element in the engaged position.

21. The assembly as claimed in claim 14, wherein a plurality of adjacent notches are formed in the inner peripheral surface and wherein one forward pawl and one reverse pawl engage adjacent notches in the inner peripheral surface in the engaged position.

22. The assembly as claimed in claim 14, further comprising an operating mechanism operatively connected to the control element to selectively shift the control element between its first and second angular positions.

23. The assembly as claimed in claim 14, wherein the control element comprises a plate-like member.

24. The assembly as claimed in claim 14, wherein the inner and outer members comprise plate-like members.

25. The assembly as claimed in claim 14, wherein the forward and reverse pawls are received and retained in different members.

26. The assembly as claimed in claim 14, wherein the control element includes at least one control portion which urges the at least one forward pawl toward its engaged position in the first position of the control element.

27. A method of controlling the engagement of inner and outer members, the inner member having an outer peripheral surface, the outer member having an inner peripheral surface adjacent the outer peripheral surface in radially inner and redially outer relationship and at least one of the members being mounted for rotation about a first axis and pawl-receiving portions and pawl-holding portions formed on the members, the method comprising:

provide at least one free-floating, forward pawl and at least one free-floating, reverse pawl adjacent to the at least one forward pawl, the pawls being received and retained in the pawl-holding portions but now physically secured to the pawl-holding portions;

urging the forward and reverse pawls outwardly from their respective pawl-holding portions;

providing a single control element between the inner and outer surfaces and being rotatable about the first axis relative to the pawl-holding portions, the control element having at least one opening which extends completely therethrough; and rotating the control element relative to the pawl-holding portions about the first axis, the at least one opening allowing the pawls to extend therethrough at the same time and be received within the pawl-receiving portions in a first angular position of the control element to fully lock the inner and outer members together to prevent relative rotation between the inner and outer members in either direction about the first axis wherein the control element maintains at least one of the pawls in a disengaged position in a second angular position of the control element in which one of the members is allowed to free-wheel relative to the other member during the rotation of the one of the members in a first direction about the first axis and the members are locked to each other in a second direction opposite the first direction about the first axis in the second angular position.

28. The method as claimed in claim 27, further comprising rotating one of the members during the step of rotating the control element.

* * * * *

UNITED STATES PATENT AND TRADEMARK OFFICE
CERTIFICATE OF CORRECTION

PATENT NO. : 7,484,605 B2
APPLICATION NO. : 11/429548
DATED : February 3, 2009
INVENTOR(S) : Brice A. Pawley et al.

Page 1 of 1

It is certified that error appears in the above-identified patent and that said Letters Patent is hereby corrected as shown below:

Column 18, Line 67, Claim 27:

Delete "redially" and insert -- radially --.

Signed and Sealed this

Fourteenth Day of April, 2009

JOHN DOLL
*Acting Director of the United States Patent and Trademark Office*